Patented June 30, 1925.

1,544,215

UNITED STATES PATENT OFFICE.

LYLE CALDWELL, OF LOMPOC, CALIFORNIA, ASSIGNOR TO THE CELITE COMPANY, OF LOS ANGELES, CALIFORNIA, A CORPORATION OF DELAWARE.

HEAT-INSULATING COMPOSITION.

No Drawing.  Application filed April 2, 1924. Serial No. 703,603.

*To all whom it may concern:*

Be it known that I, LYLE CALDWELL, a citizen of the United States, residing at the city of Lompoc, in the county of Santa Barbara, State of California, have invented a certain Improved Heat-Insulating Composition, of which the following is a specification.

This invention relates in general to compositions employed as a cement, mortar or plaster, and more particularly to those compositions suitable for use in heat insulating constructions such as walls and coverings. My invention consists in the use of a vegetable gum capable of forming a gel with water in an insulating mortar composition to give the necessary plasticity, priming and cohesion.

The amount of heat transmitted through any solid material is dependent upon its structure and density. A material of light weight will usually have a lower thermal conductivity than a denser one, so that most insulating materials now on the market are light weight and porous. Because of its structure and chemical composition diatomaceous earth, also known as kieselguhr, infusorial earth or celite, does not change in composition at high temperatures and for this reason is a most effective insulator, while common forms of magnesia insulation lose their carbon dioxide and disintegrate, giving rise to high heat losses.

In the construction of walls of heated equipment, diatomaceous earth, brick or blocks, as well as other porous, light weight materials, are extensively used to prevent heat losses. Diatomaceous earth brick are used more generally because of their greater strength and durability. These brick are exceptionally porous, minute air cells extending continuously throughout the brick. When fireclay or ordinary lime or Portland cement mortars are placed on the surface of the insulating brick to bond them together in the construction of walls and the like, rapid absorption of the water from the mortar ensues, with the result that the mortar loses its plasticity and it becomes difficult, if not impossible, to lay the brick in a workmanlike manner, and no bond is secured. Moreover, lime and Portland cement mortars have a high conductivity and transmit an appreciable amount of heat through the insulating layer. One of the primary objects of my invention is to produce a mortar having none of these disadvantages.

Another important consideration, which frequently pertains to cements or mortars for the purposes described is that they should possess good adhesive properties. The importance of this fact is illustrated for example in the case of forming heat insulating covering on vertical sides or curved bottoms of metal tanks, boilers, digesters and the like. My invention provides a material which may be applied to curved metal surfaces or brick walls in the form of an insulating, plastic cement, to which insulating brick or blocks may be applied. The mortar made in accordance with my invention will give sufficient temporary adhesion to a metal surface to hold the insulating material in place until permanently anchored with wire, netting or the like.

Another advantage which is distinctive of my improved material is the stability of the mixture. Heat insulating mortars have been made in which lye has been used, but these deteriorate with time and can not stand exposure to weather or moisture without changing so materially that their use becomes impossible. A composition such as is disclosed in these specifications will remain active indefinitely. The use of hot water, necessary in order to develop a bond in some mortars now on the market, has also been eliminated, thereby increasing the adaptability of the mortar.

In accordance with my invention, the composition comprises preferably powdered diatomaceous earth and a vegetable gum such as that obtained from India as an excretion of certain trees, such as *Astragalus gummifer* Lab., *Sterculia urens* Roxb., *Sterculia tragacantha* Lind., or species of *Cochlospermum*. These gums are imported under the names of karaya, kadaya and maura gum, kuteragummi, moringagummi, and gum tragacanth, and I refer to this general type of gum, that is a gum which consists of a plant exudation, whenever I mention gum karaya in the following description and claims. These gums are imported from the Orient in their crude form and are most often contaminated with bark, dirt and other foreign matter. As received, the gum is lumpy and has pieces ranging in size from two inches in diameter to the size of a pea and finer. For the purposes of my invention, I prefer to use these gums after purification, and in the form of a fine powder, since I find that a powdered gum will more readily swell in water and will absorb more water to form a gelatinous mass.

The ability of the gum to absorb large quantities of water and swell to many times its original size, plays an important part in my invention. After imbibition the gum is in the form of a hydrogel, or gelatinous, slimy semi-solid, which I utilize in effectively sealing the surfaces of the insulating brick being laid and thereby prevent the absorption of water from the mortar into the brick. Mortar made in accordance with my specifications has the further advantage of allowing the use of rubbed, thin joints, which prevent loss of large amounts of heat now existing, due to the use of ordinary mortar.

A composition for mortar which I have found to be very efficient, consists of 96 per cent by weight of powdered diatomaceous earth and 4 per cent by weight of gum karaya. I have also found that the addition of small amounts of various chemicals is desirable and have found that the use of 91 per cent diatomaceous earth, 5 per cent soda ash and 4 per cent of gum karaya by weight, produces an even better material for mortar. When the above mixture is wetted with 5½ parts of water to one of dry mix, a mortar of dipping consistency is made which has a greater shearing strength wet, a better bond under heat and will remain plastic for a longer time when applied to the surface of a block of diatomaceous earth than any other known mortar. Instead of diatomaceous earth, I may use tufa or other forms of vesicular material, or magnesium carbonate, waste from magnesium carbonate or lime-bonded-diatomaceous earth and asbestos blocks, or other pulverized inorganic heat insulating materials, or I may use any two or more of such insulating materials in combination.

I do not wish to limit myself to the definite proportions of the ingredients described above, as I have prepared and successfully used many other compositions containing from one half to twenty per cent gum. This variation is due to changes of the porosity of the materials with which my composition is to be used, to varying conditions of use, and the fineness, purity, and source of the gum. I have also found that numerous chemicals improve or impair the ability of the gum to form a gel with water and, although I have specified sodium carbonate (soda ash) in the foregoing composition, many other chemicals such as, for instance, sodium chloride or sodium silicate may be used. It is not possible for me to define any definite class of salts or chemicals as the preferred group, as there exists a wide difference in the action of salts from the same group; as an example, I have found that aluminum sulfate and calcium hydrate, as well as caustic soda, impair and almost destroy the influence of the gum on priming effect, although an alkaline material such as sodium carbonate, gives very good results. My invention should therefore be understood to include the use of any salt or chemical which is capable of increasing the ability of the gum to take up water and swell or the rapidity with which such water is absorbed, such salts being known as distending agents.

Although my composition is primarily designed for use as a mortar to be used with insulating materials or brick and blocks of high porosity, the composition disclosed in these specifications may be utilized wherever a heat insulating or porous body of relatively low structural strength is to be used. Safes, cabinets, vaults, fireless cookers and other metal encased equipment is often constructed with hollow walls, the space being filled with mineral wool, diatomaceous earth, cork, or like material. My composition may be very effectively utilized for this purpose and has the additional advantage of drying out into a block which has some strength, as well as unexcelled insulating qualities. It is to be understood that my invention comprises both a dry mixture of ingredients disclosed above, as well as a moulded or water wet and then dried product resulting from such a composition.

In the manufacture of a heat insulating mortar in accordance with my invention, diatomaceous earth may be finely divided or disintegrated in any common type of mill, such as a swing hammer mill, or crushing roll. The powdered gum karaya and sodium carbonate may be fed into the mill from separate hoppers, the flow of material being so regulated as to give a mixture of the required composition from the discharge of the mill. The equipment necessary will vary, naturally, with the size of the plant, whether continuous or periodic production is desired, whether the gums used are to be purified and ground, etc. and for this reason I do not limit myself to any definite type or combination of equipment.

While I have mentioned certain gums, namely gum karaya and others of the same type, I do not wish to limit my invention to any particular gum or gums. I may use any other vegetable gum which is capable of taking up water to form a gel or jelly with a swelling action or increase in volume, as it is this property of the gum upon which the advantages of its use in this connection depend.

What I claim is:

1. As a new article of manufacture, a composition comprising an inorganic heat insulating material, a vegetable gum capable of forming a gel with water and a distending agent.

2. A heat insulating composition comprising an inorganic heat insulating material and gum karaya.

3. A heat insulating composition comprising an inorganic heat insulating material, gum karaya and a distending agent.

4. A heat insulating composition comprising diatomaceous earth and gum karaya.

5. A heat insulating composition comprising diatomaceous earth, gum karaya and a distending agent.

6. A heat insulating composition comprising diatomaceous earth, gum karaya and sodium carbonate.

7. As a new article of manufacture, a heat insulating composition comprising about 91 per cent diatomaceous earth, 4 per cent gum karaya and 5 per cent sodium carbonate.

8. A heat insulating composition made by mixing an inorganic heat insulating material with gum karaya and a distending agent and then adding water thereto to develop plasticity.

9. A heat insulating composition made by mixing an inorganic heat insulating material with gum karaya and sodium carbonate and then adding water thereto to develop plasticity.

10. A heat insulating composition made by mixing diatomaceous earth with gum karaya and sodium carbonate and then adding water thereto to develop plasticity.

11. A heat insulating composition comprising diatomaceous earth and a vegetable gum consisting of a plant exudation, and capable of forming a gel with water.

12. A heat insulating composition comprising diatomaceous earth, a vegetable gum capable of forming a gel with water, and a distending agent.

13. A heat insulating composition made by mixing with water diatomaceous earth, a vegetable gum capable of forming a gel with water, and a distending agent.

In testimony whereof I have hereunto subscribed my name this 20th day of March, 1924.

LYLE CALDWELL.